United States Patent
Castillo et al.

(10) Patent No.: US 7,314,066 B2
(45) Date of Patent: Jan. 1, 2008

(54) AIR DISTRIBUTOR FOR A BIOLEACHING SYSTEM

(75) Inventors: Danny Ignacio Castillo, Autdfagasta (CL); Elliott Paul Smithson, Sanrings (CL)

(73) Assignee: BHP Billiton Innovation Pty Ltd., Melbourne VIC (AU)

( * ) Notice: Subject to any disclaimer, the term of this patent is extended or adjusted under 35 U.S.C. 154(b) by 155 days.

(21) Appl. No.: 10/849,386

(22) Filed: May 19, 2004

(65) Prior Publication Data

US 2005/0048907 A1 Mar. 3, 2005

(30) Foreign Application Priority Data

Nov. 13, 2001 (AU) .................... PR 8851
Jan. 16, 2002 (AU) .................... PR 9989
Nov. 13, 2002 (WO) .............. PCT/AU02/01546

(51) Int. Cl.
 *F16L 11/00* (2006.01)
 *F24F 13/06* (2006.01)
(52) U.S. Cl. .................. 138/114; 138/121; 138/177
(58) Field of Classification Search ........... 138/121, 138/114, 122, 110, 177; 210/448, 452; 285/236, 285/903, 921
See application file for complete search history.

(56) References Cited

U.S. PATENT DOCUMENTS

| 3,369,665 | A | * | 2/1968 | Paulson | 210/94 |
| 3,469,706 | A | * | 9/1969 | Kissell | 210/448 |
| 3,699,684 | A | * | 10/1972 | Sixt | 405/49 |
| 3,830,373 | A | * | 8/1974 | Sixt | 210/489 |
| 3,976,578 | A | * | 8/1976 | Beane | 210/484 |
| 4,098,698 | A | * | 7/1978 | Lamothe | 210/309 |
| 4,231,770 | A | | 11/1980 | Johnson, Jr. | 55/302 |
| 4,280,826 | A | | 7/1981 | Johnson, Jr. | 55/302 |
| 4,894,156 | A | * | 1/1990 | Murken | 210/448 |
| 5,335,945 | A | * | 8/1994 | Meyers | 285/236 |
| 5,603,358 | A | * | 2/1997 | Lepoutre | 138/149 |
| 6,899,359 | B2 | * | 5/2005 | Presby | 285/420 |

FOREIGN PATENT DOCUMENTS

| EP | 694635 A | 1/1996 |
| SE | 8600353 A | 7/1986 |
| SU | 1596189 A | 9/1990 |

* cited by examiner

*Primary Examiner*—Patrick F. Brinson
(74) *Attorney, Agent, or Firm*—Brinks Hofer Gilson & Lione; G. Peter Nichols

(57) ABSTRACT

An air distributor for use in heap or dump leaching systems is disclosed. The air distributor includes an air pipe having a series of holes for releasing air from the pipe and one or more protective members spaced outwardly of the air holes to shield the air holes.

6 Claims, 3 Drawing Sheets

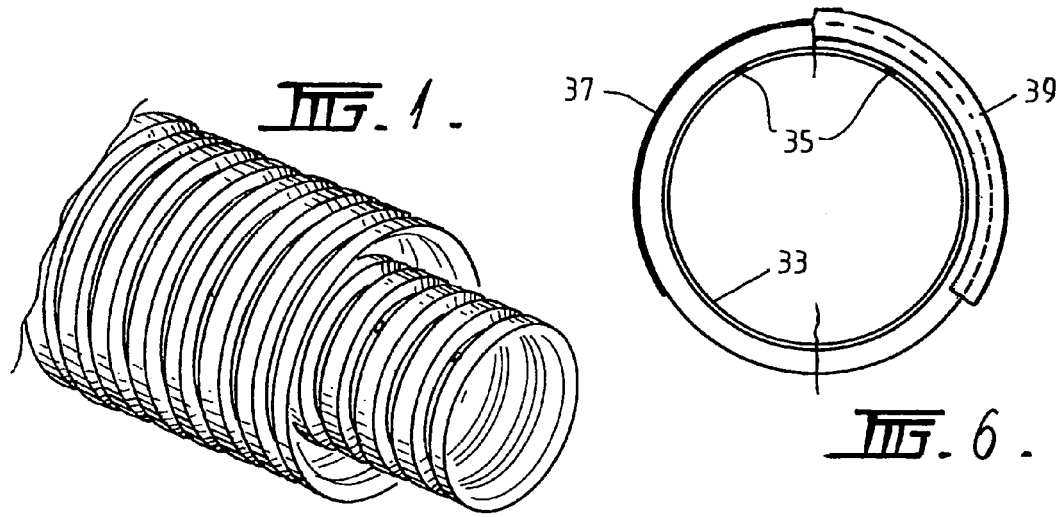
FIG. 1.
FIG. 6.
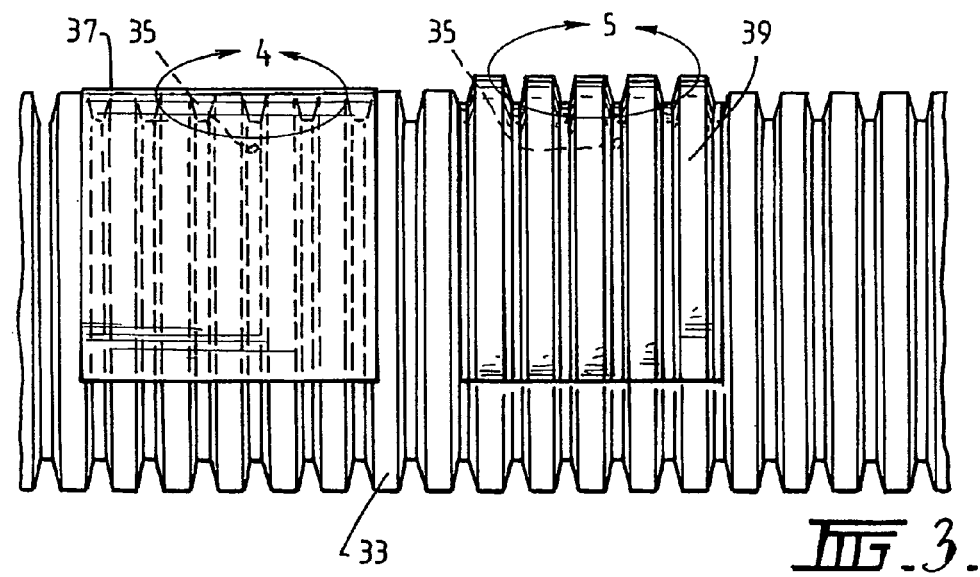
FIG. 3.
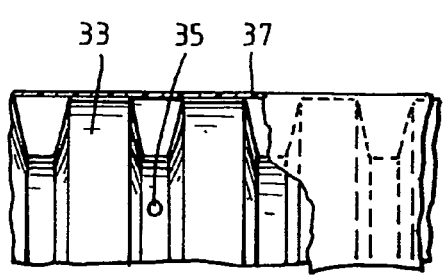
FIG. 4.
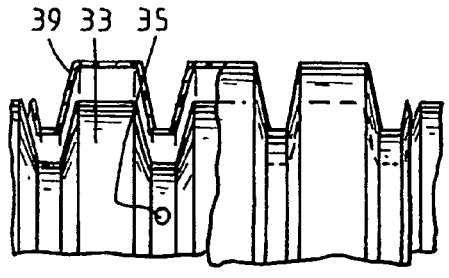
FIG. 5.

AIR DISTRIBUTOR FOR A BIOLEACHING SYSTEM

The present application claims priority to PCT/AU02/01546 which was published in English on May 22, 2003 and to Australian applications PR 8851 filed Nov. 13, 2001 and PR 9989 filed Jan. 16, 2002, the content of all three are incorporated herein by reference.

The present invention relates to bioleaching.

The present invention relates particularly to an air distributor for supplying air to a heap or dump of material being bioleached.

BACKGROUND

The term "heap" as used herein is understood to describe material that has been crushed and agglomerated and stacked mechanically in a pile.

The term "air" as used herein is understood to mean atmospheric air with or without modification of the gas composition.

The term "dump" as used herein is understood to describe material, such as run-of-mine material, that has been directly discharged from a truck into a pile.

The present invention is described in the context of bioleaching copper-bearing sulfide minerals to recover copper. However, the present invention is not limited to bioleaching this material and to recovering this metal and extends to bioleaching any material in a heap/dump that requires air to be delivered to the heap/dump.

Historically, copper was produced in the $16^{th}$ century at both the Harz Mountains in Germany and Rio Tinto in Spain using bacteria-assisted leaching. The role played by the bacteria was not known to the metallurgists of the time. During the 1960's Kennecott Copper Company led a research and operational program to understand the role of aeration, solution chemistry, dump design etc. and this understanding expanded the application of heap and dump leaching. Also, the need to stop acid mine drainage and the development of biooxidation technology for refractory gold contained in sulfides has expanded the understanding of the role of microorganisms and this knowledge is available to the copper industry. Even with all these advancements bioleaching technology is still in its infancy and, to optimize it, there is a need to understand fully the interaction of the biological, chemical, fluid, mass and heat transfer phenomena.

Bioleaching is growing in importance for the production of copper because of the need for environmentally friendly technology that is simple to implement and offers both considerable capital and/or operating cost savings. However, the application of bioleaching has not been easy and a lack of understanding of the key issues has caused industrial projects to fail to meet the designed production and/or delays in reaching the design capacity.

Ferric ions are an effective oxidizing agent at ambient conditions for the oxidation of copper-bearing sulfides in order to release copper into a soluble and thereafter recoverable form.

Oxidation of ferrous ions to ferric ions involves the following reaction:

It can be seen from the above equation that oxidation of ferrous ions to ferric ions is not possible in the absence of acid and oxygen.

Bacteria such as *Thiobacillus ferrooxidans, Leptospirillum ferrooxidans*, and *Thiobacillus thiooxidans* catalyse oxidation of ferrous ions to ferric ions at a rate $10^6$ times faster than via gaseous oxygen alone.

The bacteria are unicellular microorganisms requiring oxygen, carbon dioxide for the synthesis of organic compounds, traces of nutrients (ammonium, magnesium, calcium, potassium, sulphate, and phosphate ions) for their metabolic functions, an acidic environment, and a suitable temperature. The lack or absence of the above parameters decreases the bacterial activity and causes a decrease in the oxidation rate of copper sulfides resulting in less copper dissolution.

Biological leaching of sulfides requires air.

Initially heap/dump plants relied on natural advection but this was found to be inadequate.

In recent years plants have moved to air injection. As the heaps/dumps are usually very big this has to be done cheaply and the general solution has been to blow low pressure (typically 1-3 psi) air through corrugated HDPE pipes which are buried in the ore or in inert overliner material under the ore. In a typical industrial application the pipes are usually long, upwards of 500 m in big plants, and have air holes every 1-4 m along the length of the pipes in order to distribute air in the heaps/dumps. The air holes are usually small (1-4 mm) and the experience of the applicant is that the holes tend to become blocked very quickly. Blocking of air holes is caused by fine solids and precipitates/crystals which are carried to the air pipes by the leach solutions percolating through the heap/dump.

SUMMARY

An object of the present invention is to provide an air distributor that is considerably less susceptible to blocking than the corrugated HDPE pipes with small air holes described in the preceding paragraph.

According to the present invention there is provided an air distributor which includes an air pipe having a series of holes for releasing air from the pipe and one or more protective members spaced outwardly of the air holes to shield the air holes.

In use, when the air distributor is embedded in a heap or dump of material being bioleached and leaching solution is percolating through the heap/dump, the protective member or members prevent solution contacting the air holes and depositing material (carried by the solution) that could block the air holes.

The air pipe may be any suitable shape.

For example, the air pipe may be cylindrical.

The air pipe may also be corrugated, with a series of circumferential crests and troughs along the length of the pipe.

Preferably the air holes are in the troughs of the corrugations.

In a situation in which the air distributor includes a single protective member as opposed to a plurality of members, the member may be in the form of an outer pipe that is spaced outwardly of the air pipe whereby there is a gap between the air pipe and the outer pipe.

With this arrangement, preferably the outer pipe does not restrict air flow from the air holes in the air pipe.

The outer pipe may have a series of air holes for air that flows in use from the air pipe into the gap between the air pipe and the outer pipe via the air holes in the air pipe.

Preferably, the air holes in the outer pipe are larger than the air holes in the air pipe and therefore are less susceptible to being blocked.

In an alternative embodiment that applies to situations in which the air pipe is corrugated, the single protective member may be in the form of a sheet member that is at least partially wrapped around the air pipe and contacts the crests of the corrugations and extends over and covers the troughs that include air holes.

In another alternative embodiment, that also applies to situations in which the air pipe is corrugated, the single protective member may be in the form of a corrugated member that is at least partially wrapped around the air pipe, with the crests and troughs of the corrugated member overlying and spaced outwardly of the crests and troughs respectively of the air pipe.

With the above alternative embodiments, preferably the single protective members do not restrict air flow from the air holes in the air pipe.

In a situation in which the air distributor includes a plurality of protective members as opposed to a single member, each member may be in the form of a section of an outer pipe that is spaced outwardly of the air pipe, whereby there are gaps between the outer pipe sections and the outer pipe.

Preferably the outer pipe sections do not restrict air flow from the air holes in the air pipe.

The outer pipe sections may have a series of air holes for air that in use flows from the air pipe into the gaps between the air pipe and the outer pipe sections via the air holes in the air pipe.

Preferably, the air holes in the outer pipe sections are larger than the air holes in the air pipe and therefore are less susceptible to being blocked.

In alternative embodiments, each protective member of the plurality of protective members may be in the form of a section of the above-described sheet member or a section of the above-described corrugated member.

The outer pipe may be a solid pipe with open ends, whereby air flow from the air pipe sections can be released from the air distributor via the ends of the outer pipe sections.

The air pipe and the protective member or members may be made from any suitable material.

The air holes in the air pipe may be any suitable shape. Specifically, the present invention is not limited to arrangements in which the air holes are circular.

The air holes in the air pipe may be any suitable size or spacing.

The air holes in the outer pipe or outer pipe sections may be any suitable shape. Specifically, the present invention is not limited to arrangements in which the air holes are circular. Typically, the air holes are slots that are relatively long compared to the width of the slots.

The air holes in the outer pipe or outer pipe sections may be any suitable size or spacing. According to the present invention there is also provided a heap or dump leaching system for heap or dump leaching a material that includes the above-described air distributor positioned in and supplying air to a heap or dump of the material.

BRIEF DESCRIPTION OF THE DRAWINGS

FIG. 1 shows one embodiment of an air distributor according to the present invention.

FIG. 3 is a side elevation view that illustrates two different embodiments of the air distributor according to the present invention.

FIG. 4 is a detailed view of one of the embodiments shown in FIG. 3

FIG. 5 is a detailed view of one of the embodiments shown in FIG. 3

FIG. 6 is another embodiment of an air distributor according to the present invention.

DESCRIPTION

Figure 2:
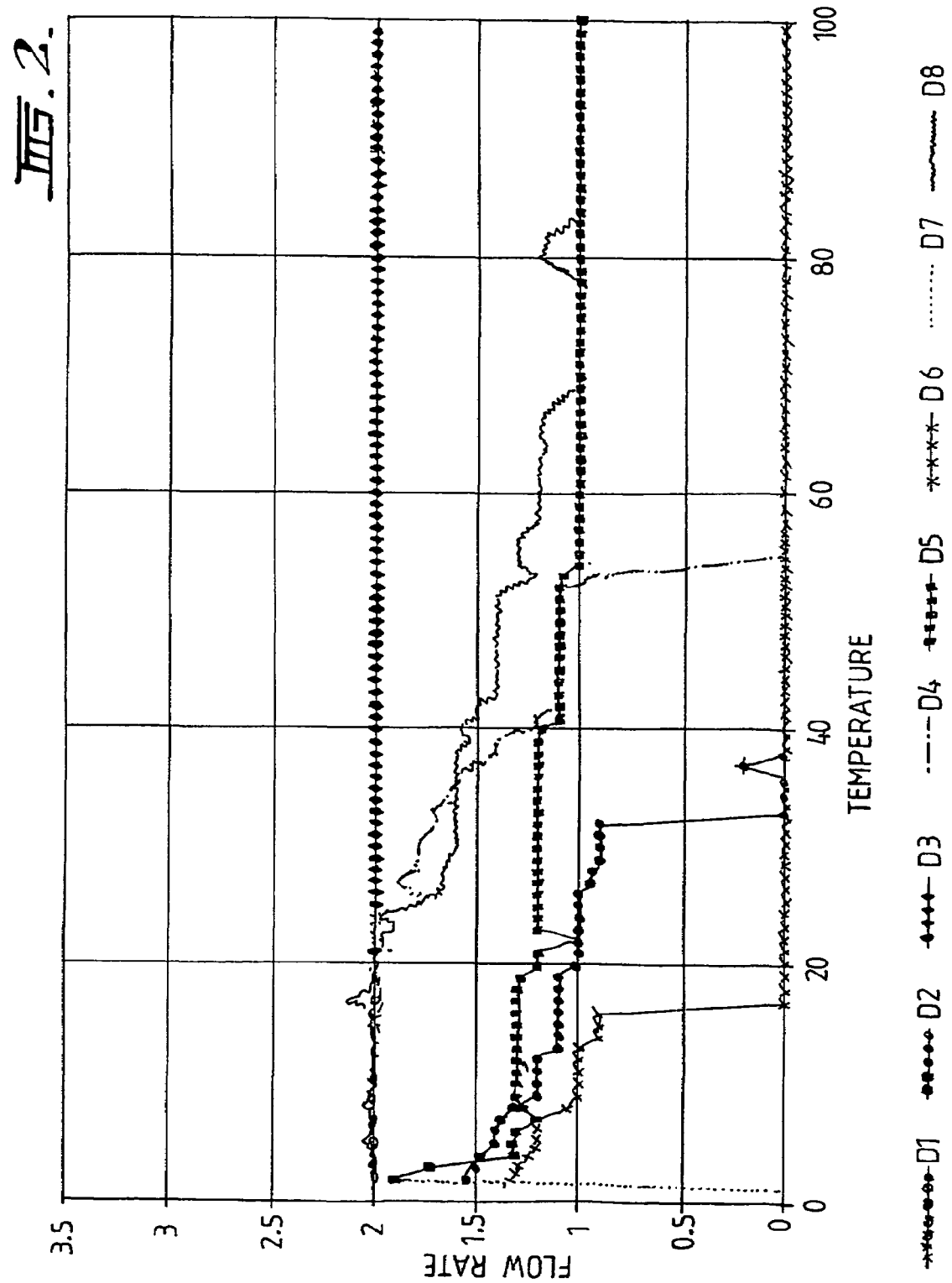
FIG. 2 shows a graph that displays the air flowrate as a function of leaching time for eight different air distributors.
Figure 7:
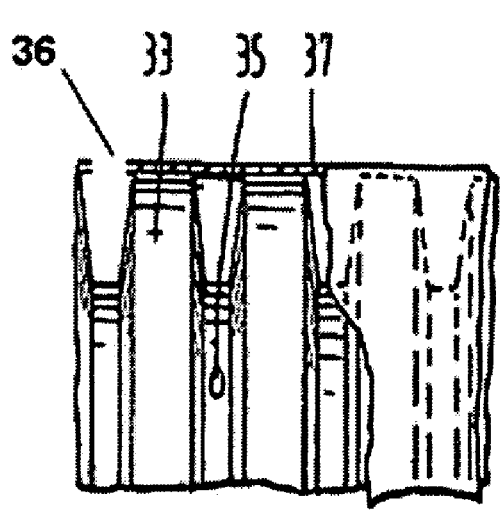
FIG. 7 is a detailed view of one embodiment of an air distributor according to the present invention.
Figure 8:
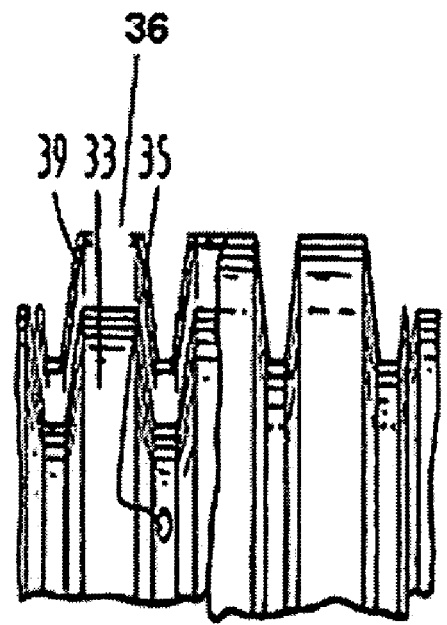
FIG. 8 is a detailed view of another embodiment of an air distributor according to the present invention.

The present invention was made during the course of an extensive laboratory/pilot plant program carried out by the applicant to investigate key operating parameters of bioleaching copper-bearing ore.

As expected, the laboratory work of the program established that the absence of aeration significantly decreased the copper leaching kinetics of the ore. Tests with no air reached 50% total copper recovery whereas tests with air reached a copper recovery in the +80% range.

The pilot plant work of the program was carried out at a bioleaching pilot plant that included crushing, agglomeration, leaching (in cribs and columns), solvent-extraction, and electro winning stages. The major focus of the pilot plant work was on the leaching process and the plant was designed to simulate industrial heap leaching plants.

The plant included 12 concrete cribs (two cribs of 4 m×5 m×6 m high and ten cribs of 2 m×2.5 m×6 m high). Each crib had internal and external insulation in order to simulate conditions in a rectangular section of an industrial heap. The amount of insulation was calculated to be equivalent to that provided by 5 m of ore around the crib.

In addition, the plant included a total of 27 columns, 24 having 0.30 m ID and 3 columns having 0.60 m ID. The 0.30 m ID columns were 6 m high and the 0.60 m columns were 12 m high. All of the columns were insulated on the same basis as the cribs.

The plant included a solution collection and irrigation system. The system was similar to that used in industrial heap leaching plants.

The plant included an aeration system. Air was added to the sulfide heaps by blowing low-pressure (1-3 psi) air via the aeration system. The aeration system included a plurality of air distribution pipes. The air distribution pipes were in the form of corrugated HDPE air pipes having circumferential crests and troughs along the length of the pipes and holes in the troughs of the corrugations. The air pipes were placed at the base of the heaps, usually above the phreatic level of the heaps.

A stacker was employed to load the cribs with ore in a similar procedure to that used in industrial heap leaching plants.

A major problem experienced in initial crib test work at the pilot plant was plugging of the air holes in the air pipes inhibiting bacterial activity in the ore and therefore limiting copper recovery.

In the initial pilot plant work the start-up air flowrate was maintained for just 15 days and then started to decrease. At day 57 all of the air holes were completely blocked.

XRD analysis performed on the material responsible for plugging the air holes showed that the material was fine solids and precipitates carried to the air pipes by the irrigation solution.

In response to the air hole blocking problem, the applicant designed and tested in the pilot plant several preferred embodiments of an air distributor of the present invention, one of which is shown in FIG. 1.

The embodiment of the air distributor shown in FIG. 1 is in the form of the above-described corrugated HDPE air pipe located inside another pipe of larger diameter. The outer pipe forms a protective member that shields the air holes in the air pipe. The outer pipe is similar to the air pipe but with a plurality of holes (the actual pipe used was the pipe normally used for collecting solutions, sometimes called a "drainflex" pipe). The holes in the outer pipe were much larger than those used in the air pipe and were sufficiently large so that the holes did not become blocked.

The other embodiment of the air distributor tested by the applicant included short sections of the outer pipe shown in FIG. 1—without air holes—positioned to enclose the sections of the air pipe that have holes. The use of air pipe sections greatly reduced the total length of the outer pipe required. It was not necessary to provide holes in the outer pipe sections because air could flow from the ends of the outer pipes.

Table 1 summarizes the test work carried out by the applicant on the preferred embodiment shown in FIG. 1 and comparative test work on the air pipe only—without the outer pipe.

The test work was carried out in pilot plant cribs. Distributors 1 to 3 were installed 1 m from the base of the cribs and distributors 4 to 6 were installed 1.5 m from the base of the cribs.

TABLE 1

DETAILS OF AIR DISTRIBUTOR TESTS

| TEST | # OF ORIFICES | ID (MM) | TYPE OF AIR DIS-TRIBUTOR | PROTEC-TION | LOCATION OF ORIFICES |
|---|---|---|---|---|---|
| 1 | 10 | 2 | Corrugated line | No | 5 in the valley & 5 in the top |
| 2 | 10 | 2 | Corrugated line | Inside a 4" Drenaflex line | 5 in the valley & 5 in the top |
| 3 | 3 | 4 | Corrugated line | No | 2 in the valley & 1 in the top |
| 4 | 3 | 4 | Corrugated line | Inside a 4" Drenaflex line | 2 in the valley & 1 in the top |
| 5 | 3 | 4 | PVC line | Inside a 4" Drenaflex line | line |
| 6 | 1 | 6 | Corrugated line | No | Top |

The main variables investigated were the size of the air holes, the number of air holes, the location of the air holes on the corrugated air pipes (valley vs. top), the air distributor material, and protection.

The results of the evaluation of the air distributors show that only tests 2, 4, and 5 were able to maintain the set air flowrate of about 60 L/min. These air distributors are the distributors protected with the "drainflex" pipe.

The air distributors of the other tests plugged after only 45 operating days.

In general, the applicant believes that a key aspect of the protection system provided by the preferred embodiment of the air distributor shown in FIG. 1 is that the outer pipe prevents contact of the leach solution with the air holes. Specifically, the applicant suspects that solution percolating down through the heap contacts the outer pipe and follows the curvature of the outer pipe and is thus kept away from the air pipe. No solution at the air holes in the air pipe means no plugging. In addition, the outer pipe performed this task successfully without impeding air flow from the air pipe. Specifically, there was a gap of about 1 cm between the air pipe and the outer pipe and the gap was sufficient to allow uninterrupted air flow. In an industrial application this gap could be larger depending on the relative sizes of the pipes used.

The applicant carried out pilot plant work to assess the performance of the above-described preferred embodiments of the air distributor against other protection systems, namely sock and mesh cloth systems.

A crib was loaded with 100%-½" MHE-A-CC mineral that was agglomerated with 4.2 kg/MT of acid and 49.5 kg/MT of water. A stacker was used to load the agglomerated ore in the crib and 8 air distributors were installed at the bottom of the crib. Distributors 1 to 4 were installed 1 m from the base of the crib and distributors 5 to 8 were installed 1.5 m from the base.

Table 2 summarizes the types of air distributors used.

TABLE 2

SUMMARY OF AIR DISTRIBUTORS

| TEST | # OF ORI-FICES | DIAMETER OF ORIFICES (mm) | TYPE OF AIR LINE | LOCA-TION OF ORIFICES IN AIR DISTRI-BUTOR | PROTEC-TION |
|---|---|---|---|---|---|
| D1 | 3 | 4 | Corrugated line | all on top | Drenaflex |
| D2 | 3 | 4 | Corrugated line | all on top | Sock |
| D3 | 3 | 4 | Corrugated line | all on top | Drenaflex cuts (about 30 cm) |
| D4 | 3 | 4 | Corrugated line | all on top | Mesh cloth over orifices |
| D5 | 3 | 4 | Corrugated line | all at the side (top) | Sock |
| D6 | 3 | 4 | Corrugated line | all on top | No protection |
| D7 | 3 | 4 | Corrugated line | all on top | Sock with humidified |
| D8 | 3 | 4 | Corrugated line | all in valley | Sock |

FIG. 2 shows a graph that displays the air flowrate as a function of leaching time for the 8 air distributors.

It is evident from the figure that almost immediately on start-up there was a decrease in the air flowrate of air distributors D2, D5, and D7. These distributors had two things in common, namely: the use of a sock and all the air holes were in the top of the air pipes. Within a 7-8 day period, the air flowrate in these air distributors was approximately 58% of the desired flow rate.

After only 16 days of operation air distributors D7 and D6 became plugged completely.

Distributor D6 had no protection and therefore was expected to plug in the first 30 days based on previous crib test work.

By the end of 3 months of operation it was evident that only the air distributors D1 and D3, i.e. the preferred embodiments of the air distributors, were able to maintain the air flowrate and it was decided to end the evaluation.

The evaluation of the air distributors demonstrated that only distributors D1 and D3 were able to maintain the set air flowrate of 56.5 L/min.

A key finding was that an air distributor protected only with short sections of outer pipe located at sections of the air pipe having air holes performed as well as full-length protection. This is important because it translates to savings at the industrial stage.

The applicant has developed and has tested successfully two other embodiments of an air distributor of the present invention. These embodiments are shown in FIG. 3 to 6.

FIG. 3 illustrates both embodiments of the air distributor. FIG. 4 is a detailed view of one of the embodiments and FIG. 5 is a detailed view of the other of the embodiments. FIG. 6 is an end view of the air distributor shown in FIG. 3.

FIG. 3 is a side elevation that illustrates a corrugated HPDE air pipe 33 that has air holes 35 in the troughs of the corrugations. FIG. 3 also illustrates a sheet member 37 and a corrugated member 39 welded to the crests of the corrugations of the air pipe 33. The sheet member 37 and the corrugated member 39 form protective members that shield the air holes 35 in the air pipe 33. The combination of the air pipe 33 and the sheet member 37 form one embodiment and the combination of the air pipe 33 and the corrugated member 39 form the other embodiment.

The sheet member 37 is a flat sheet that is wrapped approximately 270° around the circumference of the air pipe 33. The sheet member 37 extends across and covers the troughs that have the air holes 35 and thereby forms a series of channels that are defined by the sheet member 37 and the troughs. In use, the air distributor is positioned in a heap with the sheet member 37 extending over the upper section of the air distributor so that the sheet member 37 shields the air holes 35 from downwardly flowing solution. Air can flow from the air pipe 33 via the air holes 35 along the channels that are defined by the sheet member 37 and the troughs to the ends of the sheet member 37 and then into the heap.

The corrugated member 39 is identical to the sheet member 37 in terms of location on the air pipe 33 and function. The corrugated member 39 is arranged so that the crests overlie the crests of the air pipe 33 and the troughs overlie the troughs of the air pipe 33, whereby there are gaps between the crests and gaps between the troughs.

As indicated above, both embodiments shown in FIGS. 3 to 6 have been tested successfully by the applicant.

Many modifications may be made to the preferred embodiment of the present invention described above without departing from the spirit and scope of the invention.

The invention claimed is:

1. A gas distributor which includes a gas pipe having a corrugated wall and a series of holes in the wall for releasing gas from the pipe; a plurality of protective members each in the form of a section of an outer pipe spaced outwardly of the gas holes to shield the gas holes, whereby there are gaps between the outer pipe sections and the gas pipe; a series of gas holes provided in the outer pipe sections, wherein the gas holes in the outer pipe sections are larger than the gas holes in the gas pipe.

2. The gas distributor of claim 1 wherein the outer pipe sections are flat.

3. The gas distributor of claim 1 wherein the outer pipe sections are corrugated.

4. The gas distributor of claim 1 wherein the gas pipe includes a series of circumferential crests and troughs along the length of the pipe.

5. The distributor of claim 4 wherein the gas holes are in the troughs of the corrugations.

6. The gas distributor of claim 2 wherein the outer pipe sections circumscribe the gas pipe about 270°.

* * * * *